United States Patent
Li et al.

(10) Patent No.: US 9,225,405 B2
(45) Date of Patent: Dec. 29, 2015

(54) METHOD AND APPARATUS USING A BASE CODEBOOK STRUCTURE FOR BEAMFORMING

(71) Applicant: Intel Corporation, Santa Clara, CA (US)

(72) Inventors: Qinghua Li, San Ramon, CA (US); Shanshan Zheng, Beijing (CN); Hongming Zheng, Beijing (CN); Guangjie Li, Beijing (CN); Senjie Zhang, Beijing (CN); Alexei Davydov, Nizhny Novgorod (RU)

(73) Assignee: INTEL CORPORATION, Santa Clara, CA (US)

( * ) Notice: Subject to any disclaimer, the term of this patent is extended or adjusted under 35 U.S.C. 154(b) by 0 days.

(21) Appl. No.: 14/293,958

(22) Filed: Jun. 2, 2014

(65) Prior Publication Data
US 2014/0269968 A1 Sep. 18, 2014

Related U.S. Application Data

(62) Division of application No. 12/638,015, filed on Dec. 15, 2009, now Pat. No. 8,743,985.

(60) Provisional application No. 61/142,582, filed on Jan. 5, 2009.

(51) Int. Cl.
| | |
|---|---|
| H04B 7/02 | (2006.01) |
| H04B 7/04 | (2006.01) |
| H04B 7/06 | (2006.01) |
| H04L 5/00 | (2006.01) |

(52) U.S. Cl.
CPC ............ *H04B 7/0456* (2013.01); *H04B 7/0626* (2013.01); *H04B 7/0639* (2013.01); *H04B 7/0452* (2013.01); *H04B 7/0465* (2013.01); *H04L 5/0007* (2013.01); *H04L 5/0037* (2013.01)

(58) Field of Classification Search
CPC ...................................................... H04B 7/0456
USPC .......................................................... 375/267
See application file for complete search history.

(56) References Cited

U.S. PATENT DOCUMENTS

| | | | | |
|---|---|---|---|---|
| 5,408,234 | A * | 4/1995 | Chu | 341/106 |
| 2005/0237920 | A1 * | 10/2005 | Howard et al. | 370/208 |
| 2007/0226287 | A1 * | 9/2007 | Lin et al. | 708/490 |
| 2008/0316935 | A1 | 12/2008 | Bala et al. | |
| 2009/0080556 | A1 * | 3/2009 | Duan et al. | 375/262 |

OTHER PUBLICATIONS

Extended European Search Report received for European Patent Application No. 10726856.7, mailed Jun. 30, 2015, 8 pages.

* cited by examiner

*Primary Examiner* — Lihong Yu
(74) *Attorney, Agent, or Firm* — Kacvinsky Daisak Bluni PLLC

(57) ABSTRACT

Techniques for a precoding scheme for wireless communications are described. A method and apparatus may comprise a first device for a communications system to determine a beamforming structure for a closed loop transmit beamforming scheme using channel information, one or more scaling factors and one or more integers to represent a complex vector. The beamforming structure may include a codeword, a codebook and a codeword index. Other embodiments are described and claimed.

22 Claims, 4 Drawing Sheets

300

DETERMINE A CODEBOOK WITH A PLURALITY OF CODEWORDS
302

RECEIVE A CHANNEL MATRIX OVER A WIRELESS CHANNEL BY A FIRST DEVICE FROM A SECOND DEVICE
305

DETERMINE A CODEWORD FROM THE PLURALITY OF CODEWORDS IN THE CODEBOOK USING AN INNER PRODUCT BETWEEN A VECTOR IN EACH CODEWORD AND A VECTOR IN THE CHANNEL MATRIX, WHEREIN THE VECTOR IN EACH CODEWORD IS FACTORIZED INTO A SCALING FACTOR AND AN INTEGER FACTOR
310

SELECT A CODEWORD INDEX FROM THE CODEBOOK BASED ON THE DETERMINED CODEWORD
315

SEND THE CODEWORD INDEX OVER AN WIRELESS CHANNEL FROM THE FIRST DEVICE TO THE SECOND DEVICE
320

*FIG. 3*

METHOD AND APPARATUS USING A BASE CODEBOOK STRUCTURE FOR BEAMFORMING

CROSS-REFERENCE TO RELATED APPLICATIONS

This application is a divisional of, claims the benefit of, and priority to previously filed U.S. patent application Ser. No. 12/638,015 filed Dec. 15, 2009, entitled "A METHOD AND APPARATUS USING A BASE CODEBOOK STRUCTURE FOR BEAMFORMING", which claims the benefit of and priority to U.S. provisional application No. 61/142,582 filed Jan. 5, 2009, the subject-matter of which is incorporated herein in its entirety.

BACKGROUND

Multiple-Input Multiple-Output (MIMO) is a promising technology designed to improve system performance for next generation wireless communications. When a MIMO system uses Spatial Division Multiplexing (SDM) of multiple modulation symbol streams to a single user using the same time/frequency resource, it is referred to as a Single-User MIMO (SU-MIMO) system. When a MIMO system uses SDM of multiple modulation symbol streams to different users using the same time/frequency resource, it is referred to as a Multi-User MIMO (MU-MIMO) system.

MU-MIMO has been of particular interest due to its strength of benefiting from both multi-user diversity and spatial diversity. However, in order to create the greatest benefit between the communication of a mobile device and a fixed device, a beamforming technique must be determined. It is with respect to this and other considerations that the present improvements have been needed.

BRIEF DESCRIPTION OF THE DRAWINGS

FIG. 3 illustrates one embodiment of a logic flow.

DETAILED DESCRIPTION

Figure 1:
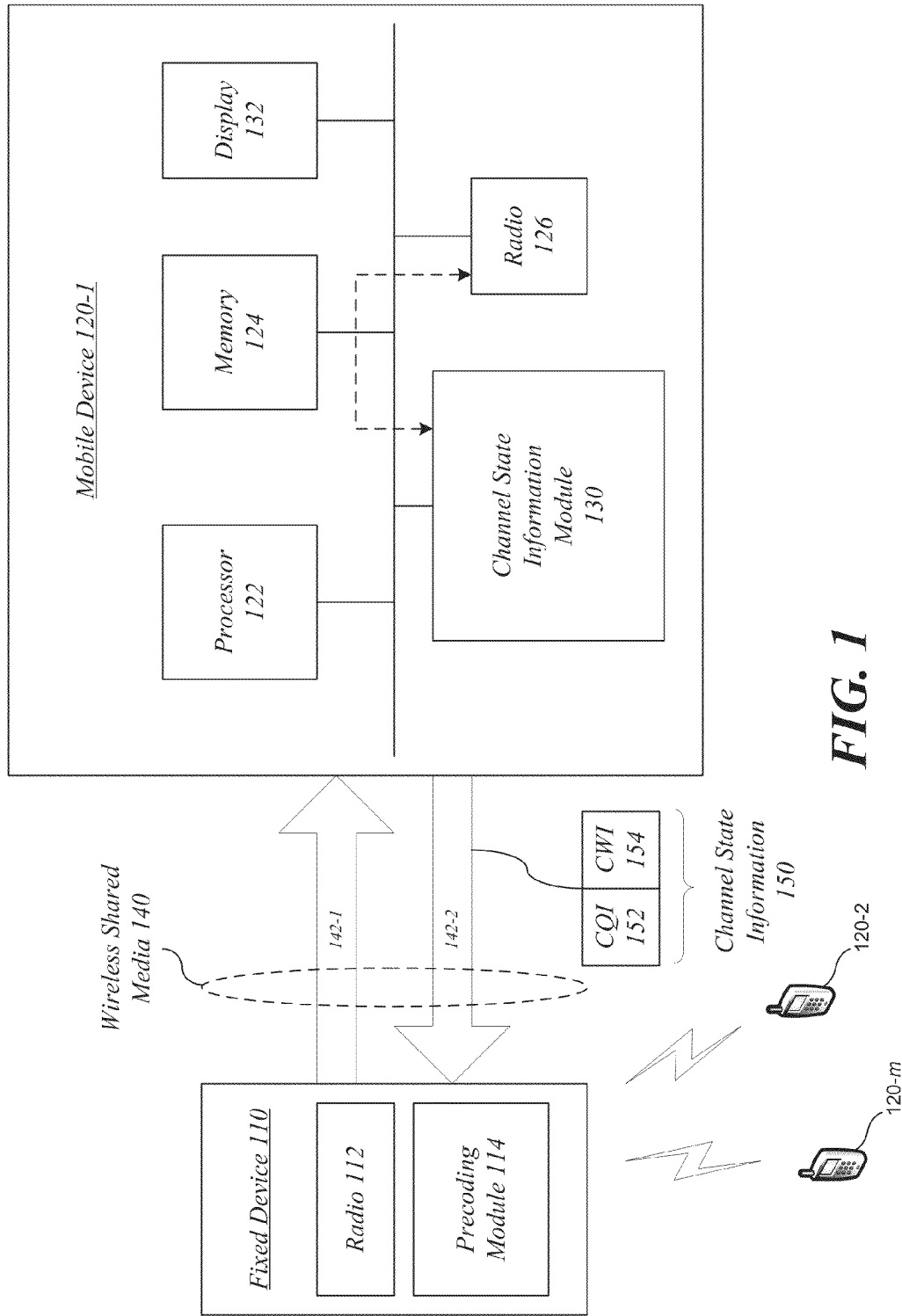
FIG. 1 illustrates one embodiment of a communications system.

Various embodiments may be generally directed to communication techniques for a wireless communications network, such as a mobile broadband communications system. Some embodiments may be particularly directed to enhanced techniques for a non-unitary precoding scheme for a closed loop MU-MIMO scheme (NUP-MU-MIMO).

The Internet is leaping towards mobile applications. This evolution is demanding ubiquitous communications at high data rates. Mobile broadband communications systems utilizing orthogonal frequency-division multiplexing (OFDM) and orthogonal frequency-division multiple access (OFDMA) techniques are emerging as one of the dominant technologies to fulfill high data rate demands.

Mobile broadband communications systems implementing MU-MIMO has been of particular interest due to its strength of benefiting from both multi-user diversity and spatial diversity. Further, MU-MIMO can provide larger cell throughput relative to SU-MIMO by exploiting channel state information at the transmitter. To realize these and other advantages, however, beamforming feedback is sent from a first device, such as a mobile device, to a second device, such as a fixed device. A beamforming matrix may be determined which enables good throughput performance over uncorrelated, weakly correlated and highly correlated communication channels, a low complexity codeword search complexity and a peak to average power ratio which is not significantly increased. To solve these and other problems, various embodiments may be directed to determining a beamforming matrix.

One embodiment, for example, may be directed to a device for a communication system to determine a beamforming structure of a closed loop transmit beamforming scheme using channel information. In an embodiment, the beamforming structure may include a codeword, a codebook and/or a codeword index.

One embodiment is directed to a mobile device (e.g., a mobile subscriber station) for a mobile broadband communications system utilizing an OFDMA technique. The mobile device may include channel state information module operative to generate channel state information (CSI) for a fixed device (e.g., a base station or access point) using a non-unitary precoding scheme for a closed loop multi-user multiple-input and multiple-output (MIMO) scheme. The CSI may comprise, for example, channel quality information (CQI) and a codeword index (CWI). The CWI may be an index for a quantized codebook, for example.

In various embodiments, one or more mobile devices may generate channel state information for a fixed device, such as a base station (BS) or access point (AP). Channel state information is information about the current value of H, a mathematical value which represents a signal channel. It forms part of the signal model in wireless communications, the full equation of which is shown in Equation (1) as follows:

$$R=HX+N \quad \text{Equation (1)}$$

where R is the received signal, X is the transmitted signal, N is the noise, and H is the channel. In one embodiment, the values R, X, N, H are usually not constant. In one embodiment, the system may need to have some information regarding H to determine what was sent from the transmitter or how to enhance system performance, such as increasing transmission speed. The information can be the current value of H, or the covariance of H. This type of information is generally referred as channel state information (CSI) and is usually estimated. Typically a current value of H (e.g., instantaneous channel matrix information) is referred as short-term CSI, while higher order statistics of H (e.g., channel correlation matrix information) are referred as long-term CSI.

In one embodiment, one or more mobile devices generate short-term CSI. For instance, a mobile device may utilize instantaneous channel matrix information from a channel matrix (H) to determine precoding vectors. A matrix comprises at least one vector. This may be suitable for use scenarios involving lower mobility environments for a mobile device, where a speed and/or velocity for the mobile device is approximately between 0 to 30 km/hr, for example. However, embodiments are not limited to this range.

In one embodiment, one or more mobile devices generate long-term CSI. For instance, a mobile device may utilize second order statistical information from the channel matrix (H), such as channel correlation matrix (R) information, to determine precoding vectors. This may be suitable for use scenarios involving higher mobility environments for a mobile device, where a speed and/or velocity for the mobile device is approximately between 30 km/hr to 120 km/hr, for example. However, embodiments are not limited to this range.

Various embodiments may utilize a full or partial channel state feedback technique for short-term CSI and long-term CSI. Some embodiments utilize partial feedback to reduce overhead and complexity. In one embodiment, a partial feedback technique includes transmitting CQI and a CWI for a quantized codebook from a mobile device to a fixed device. Additionally or alternatively, other feedback techniques may be used as well. For instance, channel sounding can also be used to provide feedback information from a mobile device. The embodiments are not limited in this context.

Some embodiments are directed to fixed devices. One embodiment, for example, is directed to a fixed device for a mobile broadband communications system utilizing an OFDMA technique. The fixed device may have a precoding module operative to generate one or more precoding vectors for multiple mobile devices using a non-unitary precoding scheme for a closed loop multi-user multiple-input and multiple-output (MIMO) scheme. The precoding module may generate the one or more precoding vectors using CSI comprising CQI and a CWI received from each of the multiple mobile devices. The fixed device may also utilize the CQI and CWI from the various mobile devices to perform scheduling operations, link adaptation operations, and other operations useful for MU-MIMO schemes.

Various embodiments may comprise one or more elements. An element may comprise any structure arranged to perform certain operations. Each element may be implemented as hardware, software, or any combination thereof, as desired for a given set of design parameters or performance constraints. Although an embodiment may be described with a limited number of elements in a certain topology by way of example, the embodiment may include more or less elements in alternate topologies as desired for a given implementation. It is worthy to note that any reference to "one embodiment" or "an embodiment" means that a particular feature, structure, or characteristic described in connection with the embodiment is included in at least one embodiment. The appearances of the phrase "in one embodiment" in various places in the specification are not necessarily all referring to the same embodiment.

FIG. 1 illustrates a block diagram of one embodiment of a communications system 100. In various embodiments, the communications system 100 may comprise multiple nodes. A node generally may comprise any physical or logical entity for communicating information in the communications system 100 and may be implemented as hardware, software, or any combination thereof, as desired for a given set of design parameters or performance constraints. Although FIG. 1 may show a limited number of nodes by way of example, it can be appreciated that more or less nodes may be employed for a given implementation.

In various embodiments, the communications system 100 may comprise, or form part of a wired communications system, a wireless communications system, or a combination of both. For example, the communications system 100 may include one or more nodes arranged to communicate information over one or more types of wired communication links. Examples of a wired communication link, may include, without limitation, a wire, cable, bus, printed circuit board (PCB), Ethernet connection, peer-to-peer (P2P) connection, backplane, switch fabric, semiconductor material, twisted-pair wire, co-axial cable, fiber optic connection, and so forth. The communications system 100 also may include one or more nodes arranged to communicate information over one or more types of wireless communication links, such as wireless shared media 140. Examples of a wireless communication link may include, without limitation, a radio channel, infrared channel, radio-frequency (RF) channel, Wireless Fidelity (WiFi) channel, a portion of the RF spectrum, and/or one or more licensed or license-free frequency bands. In the latter case, the wireless nodes may include one more wireless interfaces and/or components for wireless communication, such as one or more transmitters, receivers, transmitter/receivers ("transceivers"), radios, chipsets, amplifiers, filters, control logic, network interface cards (NICs), antennas, antenna arrays, and so forth. Examples of an antenna may include, without limitation, an internal antenna, an omni-directional antenna, a monopole antenna, a dipole antenna, an end fed antenna, a circularly polarized antenna, a micro-strip antenna, a diversity antenna, a dual antenna, an antenna array, and so forth. In one embodiment, certain devices may include antenna arrays of multiple antennas to implement various adaptive antenna techniques and spatial diversity techniques.

As shown in the illustrated embodiment of FIG. 1, the communications system 100 may include multiple elements, such as a fixed device 110 and a set of mobile devices 120-1-$m$, all of which communicate via wireless shared media 140. The fixed device may further include a radio 112 and a precoding module 114. As shown by the mobile device 120-1, the mobile devices 120-1-$m$ may further include a processor 122, a memory unit 124, a channel state information module 130, and a radio 126. The embodiments, however, are not limited to the elements shown in FIG. 1.

In various embodiments, the communications system 100 may comprise or be implemented as a mobile broadband communications system. Examples of mobile broadband communications systems include, without limitation, systems compliant with various Institute of Electrical and Electronics Engineers (IEEE) standards, such as the IEEE 802.11 standards for Wireless Local Area Networks (WLANs) and variants, the IEEE 802.16 standards for Wireless Metropolitan Area Networks (WMANs) and variants, and the IEEE 802.20 or Mobile Broadband Wireless Access (MBWA) standards and variants, among others. In one embodiment, for example, the communications system 100 may be implemented in accordance with the Worldwide Interoperability for Microwave Access (WiMAX) or WiMAX II standard. WiMAX is a wireless broadband technology based on the IEEE 802.16 standard of which IEEE 802.16-2004 and the 802.16e amendment (802.16e-2005) are Physical (PHY) layer specifications. WiMAX II is an advanced Fourth Generation (4G) system based on the IEEE 802.16j and IEEE 802.16m proposed standards for International Mobile Telecommunications (IMT) Advanced 4G series of standards. Although some embodiments may describe the communications system 100 as a WiMAX or WiMAX II system or standards by way of example and not limitation, it may be appreciated that the communications system 100 may be implemented as various other types of mobile broadband communications systems and standards, such as a Universal Mobile Telecommunications System (UMTS) system series of standards and variants, a Code Division Multiple Access (CDMA) 2000 system series of standards and variants (e.g., CDMA2000 1xRTT, CDMA2000 EV-DO, CDMA EV-DV, and so forth), a High Performance Radio Metropolitan Area Network (HIPERMAN) system series of standards as created by the European Telecommunications Standards Institute (ETSI) Broadband Radio Access Networks (BRAN) and variants, a Wireless Broadband (WiBro) system series of standards and variants, a Global System for Mobile communications (GSM) with General Packet Radio Service (GPRS)

system (GSM/GPRS) series of standards and variants, an Enhanced Data Rates for Global Evolution (EDGE) system series of standards and variants, a High Speed Downlink Packet Access (HSDPA) system series of standards and variants, a High Speed Orthogonal Frequency-Division Multiplexing (OFDM) Packet Access (HSOPA) system series of standards and variants, a High-Speed Uplink Packet Access (HSUPA) system series of standards and variants, and so forth. The embodiments are not limited in this context.

In various embodiments, the communications system 100 may comprise a fixed device 110 having wireless capabilities. A fixed device may comprise a generalized equipment set providing connectivity, management, or control of another wireless device, such as one or more mobile devices. Examples for the fixed device 110 may include a wireless access point (AP), base station or node B, router, switch, hub, gateway, and so forth. In one embodiment, for example, the fixed device may comprise a base station or node B for a cellular radiotelephone system or mobile broadband communications system. The fixed device 110 may also provide access to a network (not shown). The network may comprise, for example, a packet network such as the Internet, a corporate or enterprise network, a voice network such as the Public Switched Telephone Network (PSTN), and so forth. Although some embodiments may be described with the fixed device 110 implemented as a base station or node B by way of example, it may be appreciated that other embodiments may be implemented using other wireless devices as well. The embodiments are not limited in this context.

In various embodiments, the communications system 100 may comprise a set of mobile devices 120-1-$m$ having wireless capabilities. The mobile devices 120-1-$m$ may comprise a generalized equipment set providing connectivity to other wireless devices, such as other mobile devices or fixed devices (e.g., fixed device 110). Examples for the mobile devices 120-1-$m$ may include without limitation a computer, server, workstation, notebook computer, handheld computer, telephone, cellular telephone, personal digital assistant (PDA), combination cellular telephone and PDA, and so forth. In one embodiment, for example, the mobile devices 120-1-$m$ may be implemented as mobile subscriber stations (MSS) for a WMAN. Although some embodiments may be described with the mobile devices 120-1-$m$ implemented as a MSS by way of example, it may be appreciated that other embodiments may be implemented using other wireless devices as well. The embodiments are not limited in this context.

As shown by the mobile device 120-1, the mobile devices 120-1-$m$ may comprise a processor 122. The processor 122 may be implemented as any processor, such as a complex instruction set computer (CISC) microprocessor, a reduced instruction set computing (RISC) microprocessor, a very long instruction word (VLIW) microprocessor, a processor implementing a combination of instruction sets, or other processor device. In one embodiment, for example, the processor 122 may be implemented as a general purpose processor, such as a processor made by Intel® Corporation, Santa Clara, Calif. The processor 122 may also be implemented as a dedicated processor, such as a controller, microcontroller, embedded processor, a digital signal processor (DSP), a network processor, a media processor, an input/output (I/O) processor, and so forth. The embodiments are not limited in this context.

As further shown by the mobile device 120-1, the mobile devices 120-1-$m$ may comprise a memory unit 124. The memory 124 may comprise any machine-readable or computer-readable media capable of storing data, including both volatile and non-volatile memory. For example, the memory 124 may include read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory, polymer memory such as ferroelectric polymer memory, ovonic memory, phase change or ferroelectric memory, silicon-oxide-nitride-oxide-silicon (SONOS) memory, magnetic or optical cards, or any other type of media suitable for storing information. It is worthy to note that some portion or all of the memory 124 may be included on the same integrated circuit as the processor 122, or alternatively some portion or all of the memory 124 may be disposed on an integrated circuit or other medium, for example a hard disk drive, that is external to the integrated circuit of the processor 122. The embodiments are not limited in this context.

As further shown by the mobile device 120-1, the mobile devices 120-1-$m$ may comprise a display 132. Display 132 may comprise any suitable display unit for displaying information appropriate for a mobile computing device. In addition, display 132 may be implemented as an additional I/O device, such as a touch screen, touch panel, touch screen panel, and so forth. Touch screens are display overlays which are implemented using one of several different techniques, such as pressure-sensitive (resistive) techniques, electrically-sensitive (capacitive) techniques, acoustically-sensitive (surface acoustic wave) techniques, photo-sensitive (infra-red) techniques, and so forth. The effect of such overlays allows a display to be used as an input device, to remove or enhance the keyboard and/or the mouse as the primary input device for interacting with content provided on display 132.

In one embodiment, for example, display 132 may be implemented by a liquid crystal display (LCD) or other type of suitable visual interface. Display 132 may comprise, for example, a touch-sensitive color (e.g., 56-bit color) display screen. In various implementations, the display 132 may comprise one or more thin-film transistors (TFT) LCD including embedded transistors. In such implementations, the display 132 may comprise a transistor for each pixel to implement an active matrix. While the embodiments are not limited in this context, an active matrix display is desirable since it requires lower current to trigger pixel illumination and is more responsive to change than a passive matrix.

In various embodiments, the devices 110, 120 may communicate information over wireless shared media 140 via respective radios 112, 126. The wireless shared media 140 may comprise one or more allocations of RF spectrum. The allocations of RF spectrum may be contiguous or non-contiguous. In some embodiments, the radios 112, 126 may communicate information over the wireless shared media 140 using various multicarrier techniques utilized by, for example, WiMAX or WiMAX II systems. For example, the radios 112, 126 may utilize various MU-MIMO techniques to perform beam forming, spatial diversity or frequency diversity.

In general operation, the radios 112, 126 may communicate information using one or more communications channels, such as communications channels 142-1-$p$. A communication channel may be a defined set of frequencies, time slots, codes, or combinations thereof. In one embodiment, for example, the transmitting portion of the radio 112 of the fixed device 110 may communicate media and control information to the receiving portion of the radio 126 of the mobile devices 120-1-$m$ using the communications channel 142-1, sometimes referred to as a "downlink channel." In one embodiment, for example, the transmitting portion of the radio 126 of the mobile device 110 may communicate media and control information to the receiving portion of the radio 112 of the fixed device 110 using the communications channel 142-2, sometimes referred to as an "uplink channel." In some cases, the communications channels 142-1, 142-2 may use the same or different set of transmit and/or receive frequencies, depending upon a given implementation.

Since the communications system 100 is a mobile broadband communications system, it is designed to maintain communications operations even when a mobile device 120-1-$m$ is moving. Slower movement of the mobile devices 120-1-$m$, such as when an operator is walking, causes relatively minor degradation of communications signals due to the actual movement and is easily corrected. Faster movement of the mobile devices 120-1-$m$, such as when an operator is in a moving vehicle, however, may cause major degradation of communications signals due to frequency shifts. An example of such frequency shifts may be Doppler frequency shifts caused by the Doppler effect.

One or more of the mobile devices 120-1-$m$ may implement a channel state feedback technique to provide CSI to the fixed device 110 for a NUP-MU-MIMO scheme. In the illustrated embodiment shown in FIG. 1, the mobile device 120-1 includes a CSI module 130 operative to generate CSI 150 for the fixed device 110. The CSI 150 may comprise, for example, CQI 152 and CWI 154. The embodiments, however, are not limited to these examples of CSI 150. The operations of the mobile devices 120-1-$m$ in general, and the CSI module 130 in particular, may be described in more detail with reference to FIG. 2.

Figure 2:
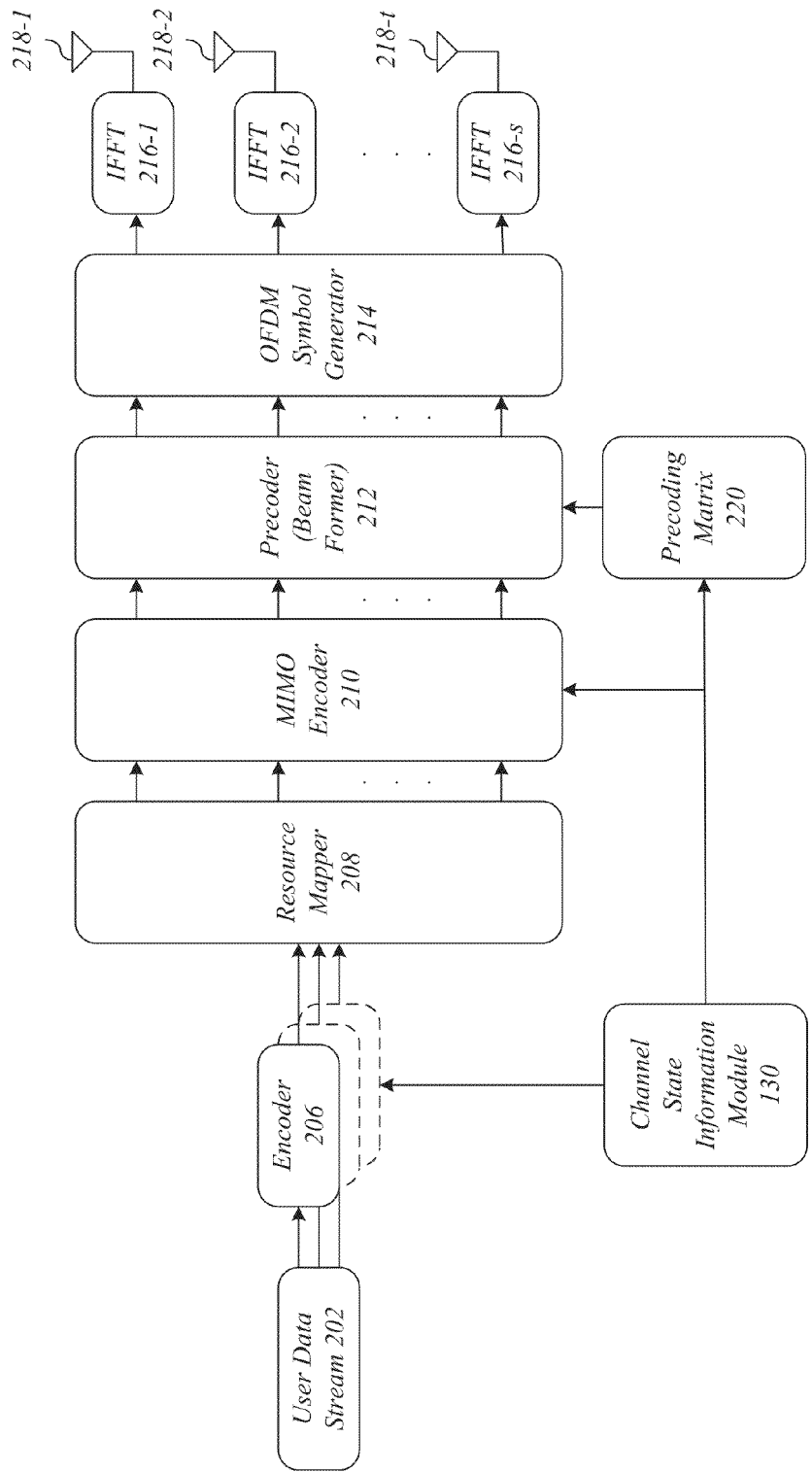
FIG. 2 illustrates one embodiment of a first MIMO architecture.

FIG. 2 illustrates one embodiment of a MIMO architecture 200. The MIMO architecture 200 may be implemented as part of the mobile devices 120-1-$m$. Although a specific number of elements are shown as part of the MIMO architecture 200, it may be appreciated that more or less elements for the MIMO architecture 200 may be used for a given implementation, and the embodiments are not limited in this context.

In the illustrated embodiment shown in FIG. 2, the MIMO architecture 200 comprises one or more encoders 206, a resource mapper 208, a MIMO encoder 210, a precoder (beam former) 212 (hereinafter referred to as "precoder 212"), an OFDM symbol generator 214, and one or more inverse Fast Fourier Transform (IFFT) blocks 216-1-$s$ for a transmitter, and one or more antennas 218-1-$t$. Each encoder 206 contains a channel encoder, interleaver, rate-matcher and modulator for each layer. The resource mapper 208 maps modulated symbols to corresponding time-frequency resources in allocated resource units (RUs). The MIMO encoder 210 maps L ($\geq$1) layers onto $N_s$($\geq$1) streams, which are fed to the precoder 212. The precoder 212 maps user data stream 202 to antennas 218-1-$t$ by generating the antenna-specific data symbols according to a selected MIMO mode (e.g., open-loop or closed-loop) utilizing the precoding matrix 220. The OFDM symbol generator 214 maps antenna-specific data to an OFDM symbol. The MIMO architecture 200 may further comprise the CSI module 130. The CSI module 130 may be arranged to generate CSI 150 for the fixed device 110.

Returning to the precoder 212, a base codebook may be used by a mobile device to compute a beamforming matrix. In an embodiment, a complex number based on beamforming feedback from a mobile device may be placed on each antenna of a fixed device to cause a constructive fading and/or combining to create a signal from the fixed device to the mobile device. Beamforming feedback may include, but is not limited to, information about a beamforming matrix or codeword and/or an index to a codeword.

FIG. 3 illustrates one embodiment of a logic flow for determining a codeword or beamforming matrix. In one embodiment, a codebook may be determined 302. The codebook may include a plurality of codewords. In one embodiment, a codebook to be used in uncorrelated channels, weakly correlated channels and/or highly correlated channels. In one embodiment, the codebook may be determined which has a good throughput performance over all the channels while ensuring the codeword search complexity remains at a minimal level. In one embodiment, a codebook may be determined which enhances system performance. Enhanced system performance may include, but is not limited to, increased transmission speed. Examples of enhanced system performance are not limited herein. As the mobile device is sensitive to complexity and power consumption, a low-complexity codeword search may be generated. In one embodiment, in addition to maximizing performance and minimizing complexity, a codebook may be determined which does not significantly increase the peak to average power ratio (PAPR). In one embodiment, determining a codebook may include determining that a peak to average power ratio based on each codeword is less than a threshold. For example, a codeword such as $[1\ 0\ 0\ 0]^T$ may be undesirable from a PAPR viewpoint as the codeword may place all the transmit power on the first antenna and no transmit power to the other three antennas. In an embodiment, since the average power may be a constant proportional to 1/N, where N is the number of transmit antennas, the maximum value of the codeword entries may be designed to be below a threshold, such as, but not limited to 0.6.

In one embodiment, a mobile device may receive 305 channel information from the fixed device. In an embodiment, the channel information may include a channel matrix H. In one embodiment, the precoder 212 may be arranged to receive 305 a channel matrix H over a wireless channel from the fixed device 110 via the radio 126. In one embodiment, beamforming may be applied to uplink wireless channels, downlink wireless channels and/or peer-to-peer networks.

In one embodiment, a codeword or beamforming matrix may be determined 310 using the codebook. In one embodiment, multi-user MIMO schemes may enable a resource allocation to communicate data to two or more mobile devices. The multi-user transmission with one stream per user may be supported for MU-MIMO. In one embodiment, MU-MIMO may include a MIMO configuration of two transmit (Tx) antennas on a fixed device to support two users. In one embodiment, four transmit antennas or eight transmit antennas on a fixed device may support up to four or eight users. Based on the number of antennas at the fixed device, the mobile device may use a codebook to determine what codeword or beamforming matrix to send to the fixed device.

A codeword for the channel may be determined 310 from the plurality of codewords in the codebook using one or more scaling factors and the channel matrix. In one embodiment, a codeword may be determined from the plurality of codewords in the codebook using an inner product between a vector in each codeword and a vector in the channel matrix. The vector in each codeword may be factorized into a scaling factor and an integer factor. In an embodiment, the inner product may be between two vectors such as, but not limited to, a vector in each candidate codeword (i.e. the candidate beamforming matrix) and a vector in the channel matrix. In one embodiment, both vectors may be complex vectors. In one embodiment, the vector of the codeword may be factorized into one or more scaling factors and one or more integer factors. The multiplication of the channel matrix and the codeword matrix may be used in the codeword search and the multiplication may require multiple inner product operations.

The codebook may include a variety of different codewords (V). The mobile device may sort through the codewords (V) using the channel matrix to determine the best codeword for the fixed device. The best codeword may be determined by balancing the goal of maximum performance of the codeword with the goal of a low-complexity search. A low-complexity search may ensure that power is not significantly increased. Increasing power may increase one or more costs of the mobile device. For example, if all the codewords in codebook have the form $$\frac{1}{\sqrt{2N}}[\pm 1 \pm j \ldots \pm 1 \pm j]^T,$$

then no multiplier may be needed for the codeword search. In an embodiment, if the codeword entries are irrational numbers without common factors, then the number of multiplications needed for the codeword search may be proportional to the number of codewords in the codebook. The multiple multipliers may be implemented at the mobile device for searching for the best word within a limited delay. The mobile device may be cost sensitive and have a low capacity.

In one embodiment, in the codeword search, a candidate beamforming matrix V may be multiplied by a channel matrix H, the full equation of which is shown in Equation (2) as follows:

$$\tilde{H}\tilde{V} \qquad \text{Equation (2)}$$

where $\tilde{H}$ is the channel beamforming matrix and $\tilde{V}$ is the candidate beamforming matrix. The tilde notation (˜) represents complex quantities and the notation without the tilde represents the real quantity. The channel matrix $\tilde{H}$ may measure the mobile device and the channel response. The channel is the medium through which the signal is sent. Based on the channel matrix $\tilde{H}$, the precoder 212 may calculate an effective channel $\tilde{H}\tilde{V}$ through which transmit antennas may send signals over the channel.

In order to calculate an effective channel $\tilde{H}\tilde{V}$, an inner product of two complex vectors may be computed. Calculating an inner product for two complex vectors may result in increased efficiencies in the determination of the codeword. As the inner product of complex vectors may occur repeatedly during a codeword search, a constraint may be placed on the ratios between any two real parts and/or between any two imaginary parts of the codeword entries to reduce the complexity of the inner product. In one embodiment, the ratio between two real parts may be an integer.

In an embodiment, the complexity of the codeword search may be reduced by making the ratios integers. For example, in a 4 by 2 beamforming matrix, the candidate beamforming matrix may be represented by Equation (3) as follows:

$$\tilde{V}=[\tilde{v}_1 \tilde{v}_2] \qquad \text{Equation (3)}$$

Additionally, the column vector may be written as Equation (4) as follows:

$$\tilde{v}_n = \begin{bmatrix} v_1(n) \\ v_2(n) \\ v_3(n) \\ v_4(n) \end{bmatrix} + i\begin{bmatrix} v_5(n) \\ v_6(n) \\ v_7(n) \\ v_8(n) \end{bmatrix}(n) = \alpha(n)\begin{bmatrix} v_1^z(n) \\ v_2^z(n) \\ v_3^z(n) \\ v_4^z(n) \end{bmatrix} + i\beta(n)\begin{bmatrix} v_5^z(n) \\ v_6^z(n) \\ v_7^z(n) \\ v_8^z(n) \end{bmatrix}, \qquad \text{Equation (4)}$$

for $n = 1, 2$.

In an embodiment, the scaling factors $\alpha(n)$ and $\beta(n)$ may vary across the codewords Vs. To decrease the complexity of the codeword search, $v_k^z(n)$s may be integers. When each $v_k^z(n)$ is an integer, the codeword search may be a low complexity codeword search. In an embodiment, the superscript notation $^z$ may represent an integral quantity.

To reduce the complexity of the codeword search, limited scaling factors such as $\alpha(n)$ and $\beta(n)$ and integers may be used to represent the complex vector. The codeword may be a candidate beamforming vector or matrix. The vector or matrix may be factorized into one or more scaling factors and one or more integer vectors. In one embodiment, one or more scaling factors and one or more integers may be used to represent a complex vector. For example, the real numbers in Equation (4) may be grouped together so that the real numbers share the same scaling factor. In an embodiment, the real numbers may be represented by small integers.

In an embodiment, the small integers may be, 0, _ $^+1, \ldots \_^+4$. The grouping is not limited to this example. For example, the real and imaginary parts of each complex entry may be grouped and one scaling factor may be assigned for each complex entry. For example, a first scaling factor may be placed on a real part of the codeword and a second scaling factor may be placed on an imaginary part of the codeword.

In a vector codebook, g may represent the channel gain. As shown below, the column index (n) may be dropped for notational simplicity. In an embodiment, the inner product of two complex vectors $\tilde{g}$ and $\tilde{v}$, may be computed as shown in Equation (5) as follows:

$$\tilde{g}\tilde{v} = ([g_1 g_2 g_3 g_4] + i[g_5 g_6 g_7 g_8])\left(\begin{bmatrix} v_1 \\ v_2 \\ v_3 \\ v_4 \end{bmatrix} + i\begin{bmatrix} v_5 \\ v_6 \\ v_7 \\ v_8 \end{bmatrix}\right) \qquad \text{Equation (5)}$$

$$= \sum_{k=1}^{4} g_k v_k - \sum_{k=4}^{8} g_k v_k + i\left(\sum_{k=1}^{4} g_k v_{4+k} + \sum_{k=1}^{4} g_{4+k} v_k\right)$$

$$= \alpha(n)\sum_{k=1}^{4} g_k v_k^z - \beta(n)\sum_{k=4}^{8} g_k v_k^z +$$

$$i\left(\beta(n)\sum_{k=1}^{4} g_k v_{4+k}^z + \alpha(n)\sum_{k=1}^{4} g_{4+k} v_k^z\right)$$

where $v_k^z(n)$ are integers, and $g_k v_k^z$ may be implemented by additions or bit shifts. In Equation (5) only four real multiplications may be required. Thus, a low-complexity codeword search may be created.

In an embodiment, to further reduce the complexity of the codeword search, $\alpha(n)$ may be set to equal) $\beta(n)$. If $\alpha(n)=\beta(n)$, Equation (5) may be simplified as shown in Equation (6) as follows:

$$\tilde{g}\tilde{v} = \alpha(n)\sum_{k=1}^{4} g_k v_k^z - \sum_{k=4}^{8} g_k v_k^z + i\alpha(n)\left(\sum_{k=1}^{4} g_k v_{4+k}^z + \sum_{k=1}^{4} g_{4+k} v_k^z\right) \qquad \text{Equation (6)}$$

Using Equation (6), if g is a real number and v is an integer of the power of 2, then $g_k v_k^z$ may be efficient. Further simplifying Equation (6), if $\alpha(n)=\beta(n)$, then only two real multiplications may be needed. In such an example, $\tilde{v}$ can be represented by Equation (7) as follows:

$$\tilde{v}=\alpha(n)[v_k^z+iv_{4+k}^z] \qquad \text{Equation (7)}$$

For a 4 by 2 beamforming codebook, it may be difficult to confine all $v_k^z$ into $\_^{+}1$, $\_^{+}2$ and $\_^{+}2^M$. In an embodiment, two numbers of $v_k^z$s may be integers or even real numbers such as represented in Equations (8) and (9) as shown below:

$$\tilde{v}_1 = \begin{bmatrix} v_1(1) \\ v_2(1) \\ v_3(1) \\ v_4(1) \end{bmatrix} + i \begin{bmatrix} v_5(1) \\ v_6(1) \\ v_7(1) \\ v_8(1) \end{bmatrix} = \alpha(1) \begin{bmatrix} v_1^z(1) \\ v_2^z(1) \\ v_3^z(1) \\ v_4^z(1) \end{bmatrix} + i\beta(1) \begin{bmatrix} v_5^z(1) \\ v_6^z(1) \\ v_7^z(1) \\ v_8^z(1) \end{bmatrix} \quad \text{Equation (8)}$$

$$\tilde{v}_2 = \begin{bmatrix} v_1(2) \\ v_2(2) \\ v_3(2) \\ v_4(2) \end{bmatrix} + i \begin{bmatrix} v_5(2) \\ v_6(2) \\ v_7(2) \\ v_8(2) \end{bmatrix} = \alpha(2) \begin{bmatrix} v_1^z(2) \\ v_2^z(2) \\ v_3^z(2) \\ v_4^z(2) \end{bmatrix} + i\beta(2) \begin{bmatrix} v_5^z(2) \\ v_6^z(2) \\ v_7^z(2) \\ v_8^z(2) \end{bmatrix} \quad \text{Equation (9)}$$

In an embodiment, $v_4^z(2)$ and $v_8^z(2)$ may be integers (or real numbers) not in the $\{0, \_^{+}1, \_^{+}2, \ldots \_^{30} 2^M\}$ grouping. Since $\tilde{v}_1$ and $\tilde{v}_2$ are orthogonal, $v_4(2)$ and $v_8(2)$ may be determined by the other $v_k^z(n)$s, such as in Equation (10) as shown below:

$$\sum_{k=1}^{4} v_k(1)v_k(2) - \sum_{k=1}^{4} v_{k+4}(1)v_{k+4}(2) = 0 \quad \text{Equation (10)}$$

$$\sum_{k=1}^{4} v_k(1)v_{k+4}(2) + \sum_{k=1}^{4} v_{k+4}(1)v_k(2) = 0$$

In an embodiment, there is a group of two-variable equations about $v_4(2)$ and $v_8(2)$ such as represented in Equation (11) as shown below:

$$\alpha(1)v_4^z(1)v_4(2) - \beta(1)v_8^z(1)v_8(2) \quad \text{Equation (11)}$$

$$\alpha(1)\alpha(2)\sum_{k=1}^{3} v_k(1)v_k(2) -$$

$$\beta(1)\beta(2)\sum_{k=1}^{3} v_{k+4}(1)v_{k+4}(2)$$

$$\beta(1)v_8^z(1)v_4(2) + \alpha(1)v_4^z(1)v_8(2) =$$

$$-\alpha(1)\beta(2)\sum_{k=1}^{3} v_k(1)v_{k+4}(2) - \alpha(2)\beta(1)\sum_{k=1}^{3} v_{k+4}(1)v_k(2))$$

Solving Equation (11) may create two real numbers for $v_4(2)$ and $v_8(2)$. During the codebook search, $\alpha(n)$ and $\beta(n)$ may be computed after the orthogonality requirement is satisfied. In one embodiment, $\alpha(n)$ and $\beta(n)$ may be set to unity in Equation (9) and the linear equation in Equation (11) may be solved. After $v_4(2)$ and $v_8(2)$ are obtained, the unit normalization requirement of $\tilde{v}_n$s may be used to compute the normalization factors $\alpha(n)$ and $\beta(n)$s.

In an embodiment, a codeword may be constrained to not significantly increase the peak to average power ratio (PAPR). To reduce the PAPR of beamforming, additional constraints may be placed on $v_k^z$ and $v_{4+k}^z$. For example, in an embodiment, the constraint may be $C_0 \leq |v_k^z| + |v_{4+k}^z| \leq C_1$, where $C_0$ and $C_1$ are some constraints independent of k. In an embodiment, determining a codeword may include determining a complex number to place on each antenna at the fixed device to ensure that a PAPR base on the codeword is less than a threshold. For example, the thresholds may be 1 and 6 for $C_0$ and $C_1$, respectively. In an embodiment, the PAPR may be taken into account in the codebook design to ensure that the peak or magnitude of the each codeword entry is below a threshold.

In an embodiment, a codeword index from the codebook may be selected 315 based on the codeword. Each codeword in the codebook may be assigned a different integer number that is the index of the codeword. In an embodiment, the codeword indexes may be contiguous. The indexing of the codeword may be the same at both the feedback sender and the receiver. By using the same indexing, the receiver of the index may look up the codeword in the same codebook after receiving the index. Once the best codeword is found, its corresponding index may be sent.

In an embodiment, the mobile device may send 320 the codeword index to the fixed device. In an embodiment, the codeword index may be sent over a wireless channel from the mobile device to the fixed device. In an embodiment, at the fixed device, the codeword index may be used to determine the weights (i.e. complex numbers) used for the one or more antennas on the fixed device.

Figure 4:
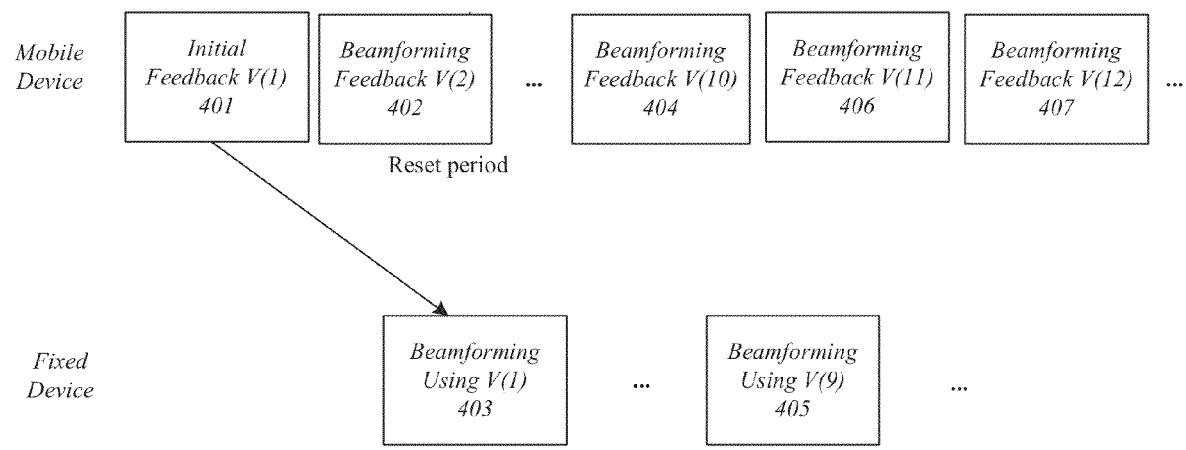
FIG. 4 illustrates one embodiment of a signal model and operations of beamforming feedback.

FIG. 4 illustrates one embodiment of a signal model and operations of beamforming feedback. As shown in Equation (12) below, the output of the beamformer y may be equal to the channel matrix H times the codeword $\tilde{V}$ times the transmit signals s plus the noise interference n at the receiver antenna.

$$y = H\tilde{V}s + n \quad \text{Equation (12)}$$

FIG. 4 discloses a mobile device sending an initial feedback $\tilde{V}(1)$ 401 to a fixed device. In an embodiment, the initial feedback 401 is created by receiving the channel H and determining a codeword $\tilde{V}$. The beamforming feedback $\tilde{V}(2)$, or codeword, may be sent to the fixed device. The fixed device may use the initial feedback $\tilde{V}(1)$ 401 to send one or more symbols and/or signals. In an embodiment, this process may continue after a reset period and the mobile device may continue to send beamforming feedback 404, 406, 407 to the fixed device. The fixed device may continue to use the beamforming feedback 405 to send one or more symbols and/or signals.

The embodiments provide significant technical advantages over conventional techniques for MU-MIMO. For example, the NUP-MU-MIMO techniques described herein outperform other codebooks for uncorrelated, semi-correlated and highly correlated channels. The codebook described above outperforms conventional techniques for all channels for multi-user MIMO with zero-forcing beamforming and single user closed book MIMO. Other technical advantages exist as well, and the embodiments are not limited to these examples.

Numerous specific details have been set forth herein to provide a thorough understanding of the embodiments. It will be understood by those skilled in the art, however, that the embodiments may be practiced without these specific details. In other instances, well-known operations, components and circuits have not been described in detail so as not to obscure the embodiments. It can be appreciated that the specific structural and functional details disclosed herein may be representative and do not necessarily limit the scope of the embodiments.

Various embodiments may be implemented using hardware elements, software elements, or a combination of both. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. Examples of software may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

Some embodiments may be described using the expression "coupled" and "connected" along with their derivatives. These terms are not intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still co-operate or interact with each other.

Some embodiments may be implemented, for example, using a computer-readable medium or article which may store an instruction or a set of instructions that, if executed by a computer, may cause the computer to perform a method and/or operations in accordance with the embodiments. Such a computer may include, for example, any suitable processing platform, computing platform, computing device, processing device, computing system, processing system, computer, processor, or the like, and may be implemented using any suitable combination of hardware and/or software. The computer-readable medium or article may include, for example, any suitable type of memory unit, memory device, memory article, memory medium, storage device, storage article, storage medium and/or storage unit, for example, memory, removable or non-removable media, erasable or non-erasable media, writeable or re-writeable media, digital or analog media, hard disk, floppy disk, Compact Disk Read Only Memory (CD-ROM), Compact Disk Recordable (CD-R), Compact Disk Rewriteable (CD-RW), optical disk, magnetic media, magneto-optical media, removable memory cards or disks, various types of Digital Versatile Disk (DVD), a tape, a cassette, or the like. The instructions may include any suitable type of code, such as source code, compiled code, interpreted code, executable code, static code, dynamic code, encrypted code, and the like, implemented using any suitable high-level, low-level, object-oriented, visual, compiled and/or interpreted programming language.

Unless specifically stated otherwise, it may be appreciated that terms such as "processing," "computing," "calculating," "determining," or the like, refer to the action and/or processes of a computer or computing system, or similar electronic computing device, that manipulates and/or transforms data represented as physical quantities (e.g., electronic) within the computing system's registers and/or memories into other data similarly represented as physical quantities within the computing system's memories, registers or other such information storage, transmission or display devices. The embodiments are not limited in this context.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

The invention claimed is:

1. A method, comprising:
   determining a codebook with a plurality of codewords, the codebook subject to a constraint on a ratio between two real parts of each codeword;
   receiving channel information over a wireless channel by a first device from a second device, wherein the channel information comprises a channel matrix;
   determining a codeword from the plurality of codewords in the codebook using an inner product between a vector in each codeword and a vector in the channel matrix, wherein the vector in each codeword is factorized into a scaling factor and an integer factor;
   selecting a codeword index from the codebook based on the determined codeword; and
   sending the codeword index over a wireless channel from the first device to the second device.

2. The method of claim 1 wherein determining the codeword comprises multiplying the channel matrix by each codeword.

3. The method of claim 1 wherein determining the codeword comprises determining one or more bit shifts.

4. The method of claim 1 wherein the codeword comprises a beamforming matrix.

5. The method of claim 1 wherein determining the codebook comprises determining that a peak to average power ratio based on each codeword is less than a threshold.

6. The method of claim 1 wherein determining the codeword comprises:
   for each codeword of the plurality of codewords, placing a first scaling factor on a real part of a codeword and a second scaling factor on an imaginary part of the codeword.

7. The method of claim 1 wherein
   the constraint comprises that the ratio is an integer.

8. The method of claim 1 wherein the codebook is used for a single data stream.

9. The method of claim 1 wherein the codebook is used for multiple data streams.

10. The method of claim 1 wherein the first device is a mobile device and the second device is a fixed device.

11. The method of claim 1 wherein the channel information comprises a channel matrix for one or more of an uncorrelated channel, a highly correlated channel and a weakly correlated channel.

12. At least one non-transitory computer-readable storage medium comprising a set of instructions that, in response to being executed, cause a system to:
   determine a codebook with a plurality of codewords, the codebook subject to a constraint on a ratio between two real parts of each codeword;
   access channel information received over a wireless channel from a remote device, the channel information to comprise a channel matrix;
   determine a codeword from the plurality of codewords in the codebook using an inner product between a vector in each codeword and a vector in the channel matrix, the vector in each codeword to be factorized into a scaling factor and an integer factor;
   select a codeword index from the codebook based on the determined codeword; and
   send the codeword index over a wireless channel to the remote device.

13. The at least one non-transitory computer-readable storage medium of claim 12, the determination of the codeword to comprise multiplying the channel matrix by each codeword.

14. The at least one non-transitory computer-readable storage medium of claim 12, the determination of the codeword to comprise determining one or more bit shifts.

15. The at least one non-transitory computer-readable storage medium of claim 12, the codeword to comprise a beamforming matrix.

16. The at least one non-transitory computer-readable storage medium of claim 12, the determination of the codebook to comprise determining that a peak to average power ratio based on each codeword is less than a threshold.

17. The at least one non-transitory computer-readable storage medium of claim 12, the determination of the codeword to comprise:
   for each codeword of the plurality of codewords, placing a first scaling factor on a real part of a codeword and a second scaling factor on an imaginary part of the codeword.

18. The at least one non-transitory computer-readable storage medium of claim 12,
   wherein the constraint comprises that the ratio is an integer.

19. The at least one non-transitory computer-readable storage medium of claim 12, the codebook to be used for a single data stream.

20. The at least one non-transitory computer-readable storage medium of claim 12, the codebook to be used for multiple data streams.

21. The at least one non-transitory computer-readable storage medium of claim 12, the remote device to comprise a fixed device.

22. The at least one non-transitory computer-readable storage medium of claim 12, the channel information to comprise a channel matrix for one or more of an uncorrelated channel, a highly correlated channel and a weakly correlated channel.

* * * * *